(12) United States Patent
Chen et al.

(10) Patent No.: US 6,866,887 B1
(45) Date of Patent: Mar. 15, 2005

(54) METHOD FOR MANUFACTURING PDLC-BASED ELECTRO-OPTIC MODULATOR USING SPIN COATING

(75) Inventors: Xianhai Chen, San Jose, CA (US); Alexander Nagy, Santa Cruz, CA (US)

(73) Assignee: Photon Dynamics, Inc., San Jose, CA (US)

( * ) Notice: Subject to any disclaimer, the term of this patent is extended or adjusted under 35 U.S.C. 154(b) by 0 days.

(21) Appl. No.: 10/686,367

(22) Filed: Oct. 14, 2003

(51) Int. Cl.⁷ .............................. B05D 3/12; B05D 1/36
(52) U.S. Cl. ...................... 427/240; 427/352; 427/377; 427/407.2; 427/425; 156/74; 156/182; 118/52; 118/320
(58) Field of Search .................. 427/240, 425, 427/377, 352, 407.2; 156/99, 230, 239, 247, 249, 74, 182; 118/52, 320

(56) References Cited

U.S. PATENT DOCUMENTS 4,024,835 A * 5/1977 Scheu et al. ................. 118/52
6,012,858 A * 1/2000 Konishi et al. ............. 396/611
6,151,153 A 11/2000 Bryan
6,211,991 B1 4/2001 Bryan
6,349,086 B2 * 2/2002 Nishida et al. ............. 369/280
6,392,725 B1 * 5/2002 Harada et al. ................ 349/74
2001/0018093 A1 * 8/2001 Decre ........................... 427/58

* cited by examiner

Primary Examiner—Kirsten Jolley
(74) Attorney, Agent, or Firm—Townsend and Townsend and Crew LLP; Kenneth R. Allen

(57) ABSTRACT

Electro-optic structures are constructed by spin coating water based emulsions or solvent based sensor materials, preferably a solvent-based polymer dispersed liquid crystal (PDLC), onto a substrate under conditions of controlled solvent evaporation. In a particular process, the uniformity of the PDLC coating is achieved by 1) spin coating in a semi-sealed chamber, 2) "converting" a square substrate into round substrate by using a fixture; 3) providing a controllable distance between the substrate and a spin coater top cover; and 4) providing a controllable solvent evaporation rate.

8 Claims, 3 Drawing Sheets

METHOD FOR MANUFACTURING PDLC-BASED ELECTRO-OPTIC MODULATOR USING SPIN COATING

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

This invention relates to manufacturing processes for electro-optic modulators based on properties of polymer dispersed liquid crystal (PDLC) material for use in testing arrays of thin film transistors (TFT). More particularly, this invention relates to manufacturing processes involving solvent-based polymer dispersed liquid crystal (PDLC).

Over the past decade, Photon Dynamics, Inc., of San Jose, Calif., has been manufacturing electro-optic modulators by an assembly process especially adapted to a class of raw material called NCAP involving a multi-step lamination process. Due to various complications, the result was relatively low yield of the final modulator. Problems included lack of surface flatness and smoothness, and edge/corner defects. The existing yield problem is related to:

Starting material. The NCAP itself is made by a slot-die coating process and has a thickness variation of up to ±1 micron according to specification. The NCAP is sandwiched between 2 pieces of 7 mil (175 micron) polymer film (Mylar®). According to its specification, the Mylar has a 10% thickness variation. Although the variation in small areas is much less, there is nevertheless up to ±1 micron thickness variations for a 73 mm square.

Process. The NCAP lamination process, which uses an optical UV adhesive, created additional thickness variations. The top layer Mylar peeling process further generated thickness variation, surface roughness, edge/corner defects, and electro-optical non-uniformity.

A transfer coating process has been disclosed in U.S. Pat. No. 6,151,153 "Modulator Transfer Process and Assembly" assigned to Photon Dynamics, Inc. However, this transfer coating process has been found to have limitations because the process cannot eliminate thickness non-uniformity of NCAP material, and because, between NCAP and a glass substrate, the process requires UV-curable adhesive. It has been found that this adhesive damages NCAP film during the process. Therefore, transfer coating is not suited to all desired assembly processes.

In a related development, the inventors have developed a direct coating process related to mechanisms for applying sensor materials. Such work is described in U.S. patent application Ser. Nos. 10/685,552 and 10/685,687 filed contemporaneously.

SUMMARY OF THE INVENTION

According to the invention, electro-optic structures are constructed by spin coating water-based emulsions or solvent-based sensor materials, preferably a solvent-based polymer dispersed liquid crystal (PDLC), onto a substrate under conditions of controlled solvent evaporation. In a particular process, the uniformity of the PDLC coating is achieved by 1) spin coating in a semi-sealed chamber, 2) "converting" a square substrate into round substrate by using a fixture; 3) providing a controllable distance between the substrate and a spin coater top cover; and 4) providing a controllable solvent evaporation rate.

Spin-coating, a process known in the semiconductor industry, has been adapted for use in the manufacturing process according to the invention involving the deposition of sensor material such as PDLC, where controlled spin coating can substantially reduce or eliminate the thickness and electro-optical variations in PDLC.

The invention has a number of advantages. It produces controlled polymer/liquid crystal phase separation and uniform liquid crystal droplet size. It results in improved modulator quality with exceptional surface flatness and smoothness. The noise associated with TFT array testing can be significantly reduced. Compared with other NCAP lamination processes, the spin coating process is semi-automatic and simplified. Manufacturing yield is significantly improved due to fewer process steps, greater consistency and improved quality.

A particular application of the present invention is the manufacture of a uniform solvent-based PDLC coating on a square substrate. The uniformity of the PDLC coating is achieved by 1) a semi-sealed spin coating system; 2) "converting" a square substrate into round substrate by using a fixture; 3) providing a controllable distance between the substrate and a spin coater top cover; and 4) providing a controllable solvent evaporation rate.

The invention will be better understood by reference to the following detailed description in connection with the accompanying drawings.

DETAILED DESCRIPTION OF THE INVENTION

Figure 1:
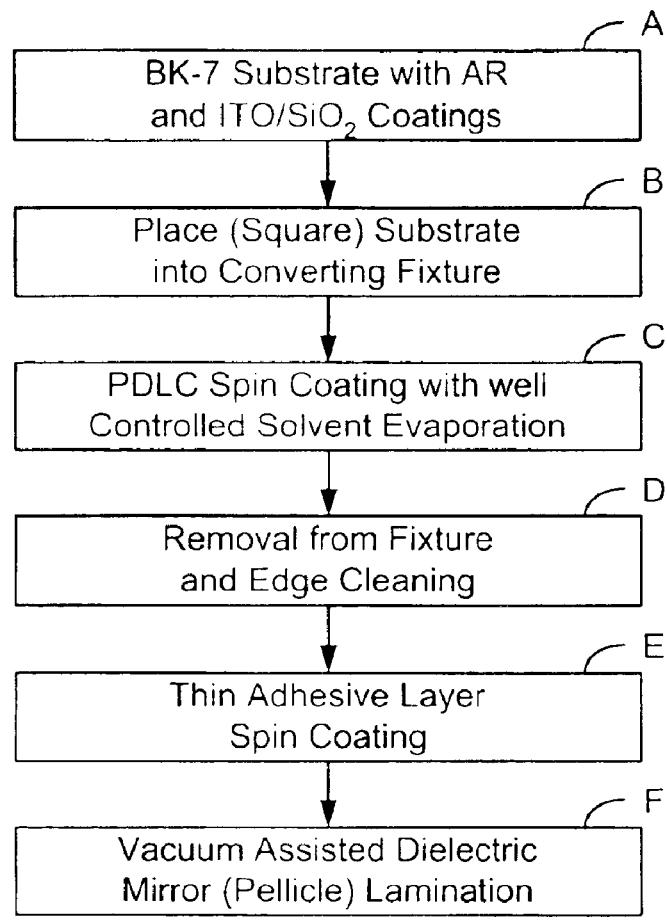
FIG. 1 is a flow chart of the process for manufacturing an electro-optic modulator according to the invention.

Referring to FIG. 1, the process according to the invention is illustrated. A glass substrate, such as a square block of BK-7 glass, is provided which has been provisioned with an anti-reflective (AR) coating on the uncoated bottom side, with gold coatings on its four lateral sides, and indium tin oxide (ITO)/SiO$_2$ coatings on the topside (Step A). The ITO coating thoroughly covers between opposite sidewalls.

Figure 2A:
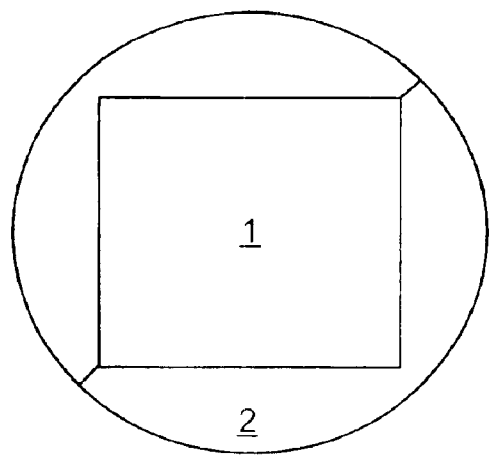
FIG. 2A is a top view of a collar according to the invention.
Figure 2B:
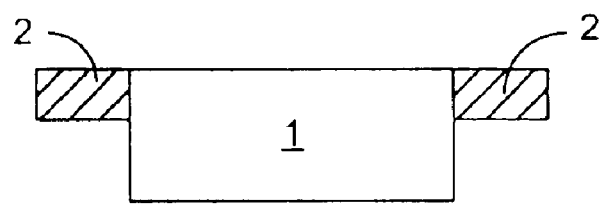
FIG. 2B is a side view of a collar according to the invention.

Referring to FIGS. 2A and 2B with 1, the substrate, which is typically a square glass block is placed into a converting fixture or collar 2 in order to convert the square surface into the equivalent of a round or enclosure-conforming substrate to accommodate the spin coating process (Step B). As shown in FIGS. 2A and 2B, a two-piece semi circular collar fixture 2 made of aluminum or other material is placed around the square BK-7 substrate 1. The fixture 2 is set so that its surface is at the same level as the top of the BK-7 substrate 1. The primary purpose of circularizing the square substrate 1 is to promote uniform gas flow on the top of the substrate 1 and of the fixture 2 during the spin coating process, thus resulting a uniform coating film.

Thereafter the surface of the substrate 1 and juxtaposed fixture is spin coated with PDLC under controlled evaporation conditions (Step C). Any PDLC solution or emulsion may be used in this process assuming its composition is consistent with the spin coating process. Solvent-based polymer/liquid crystal mixtures are preferred. Examples of polymers include commercially-available Paraloid® AU1033 (Rohm and Hass, Philadelphia, Pa.), Doresco® TA45-8, Doresco® TA65-1 thermoset acrylic resins (Dock Resins Corporation, a unit of Lubrizol Corporation, Wickliffe, Ohio) and polymethylmethacrylate, etc. Examples of liquid crystals include TL203, TL-205, TL215, TL216, and E7, etc. The PDLC formulation is typically 60–70% liquid crystal, and the remainder is mostly polymer as mentioned above.

Figure 3:
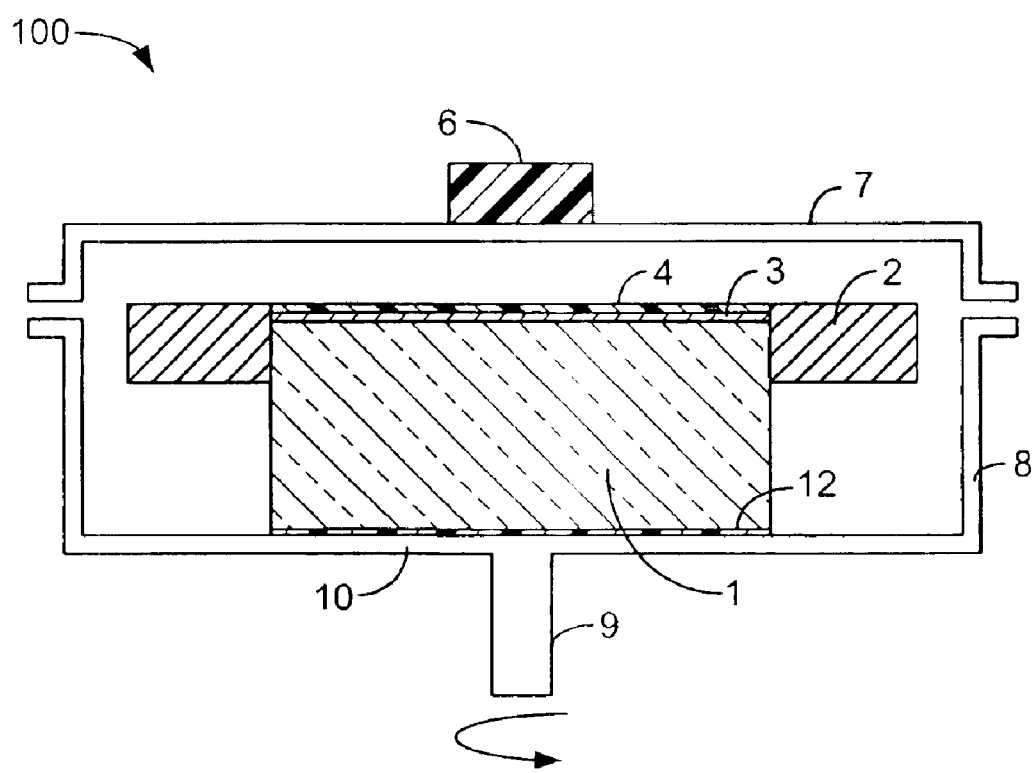
FIG. 3 is a side cross-sectional view of a spin coating chamber used in accordance with the invention.

For solvent-based polymer/liquid crystal systems, phase separation between polymer and liquid crystal occurs during solvent evaporation. Solvent evaporation control during the coating process is important for proper deposition. To this end, a specially designed spin coater 100, such as shown in FIG. 3, is used to promote a controllable solvent evaporation rate. The square glass substrate 1 is placed in the enclosure, which has its face with an antireflective (AR) coating 12 on a vacuum chuck 10 and its opposing face on an ITO layer 3, over which is an $SiO_2$ layer 4. The converting fixture 2 serves as a collar. A cover height adjustor 6 is attached to a flat cover 7 to the enclosure 100 mating with a spinner bowl 8 that is mounted on a spinner axle. The distance between substrate surface (layer 4) and the flat cover 7 can be adjusted by the cover height adjustor 6, which, along with the ambient pressure and temperature, controls the solvent evaporation rate. Ideally the distance between substrate and flat cover should be between 0.5 cm to 5 cm. The solvent evaporation rate is therefore controlled by the spinning created air flow which is a function of 1) the distance between substrate and flat cover, 2) the gap between spinner bowl 8 and flat cover 7, and 3) spin speed. The evaporation rate is also affected by providing a partial seal around the spinner bowl 8. For a typical 5 ml deposition which is approximately 50% solvent content, accelerated evaporation is set to be preferably between 2 minutes and 8 minutes, most preferably spinning for nearly 8 minutes to achieve near complete evaporation without total evisceration. If accelerated evaporation is extended for 10 minutes at this rate of evaporation, the material is fully dried. If there is no accelerated evaporation, or accelerated evaporation is for less than 1 minute, then defects will be found in the surface.

After spin coating, edge beads remain on the fixture 2 and the substrate 1 due to the surface tension effect. Any edge bumps greater than 5 microns are not allowed for direct EO modulator fabrication. This is less stringent than in the pellicle lamination process, which doesn't allow any irregularities or bumps. Therefore, the substrate is removed from the fixture and the edge beads are removed (Step D) before proceeding with a pellicle lamination process. The preferred edge beads removal method is to use plastics 'knife' (such as a Mylar® sheet) to remove the edge without damaging the ITO coating.

A water based adhesive 16 is then used to coat over PDLC 15 material (Step E). It can do so without damaging the surface of the PDLC 15. Such materials include polyurethane dispersions such as Neorez® R-967 (Neoresins of Wilmington, Mass.), acrylate dispersions, and waterborne epoxies, etc. The thickness of the adhesive layer 6 is controlled in the range of 0.5~1.5 microns. This thin adhesive layer 16 can significantly enhance the adhesion between PDLC 15 material and a pellicle 17.

Figure 4:
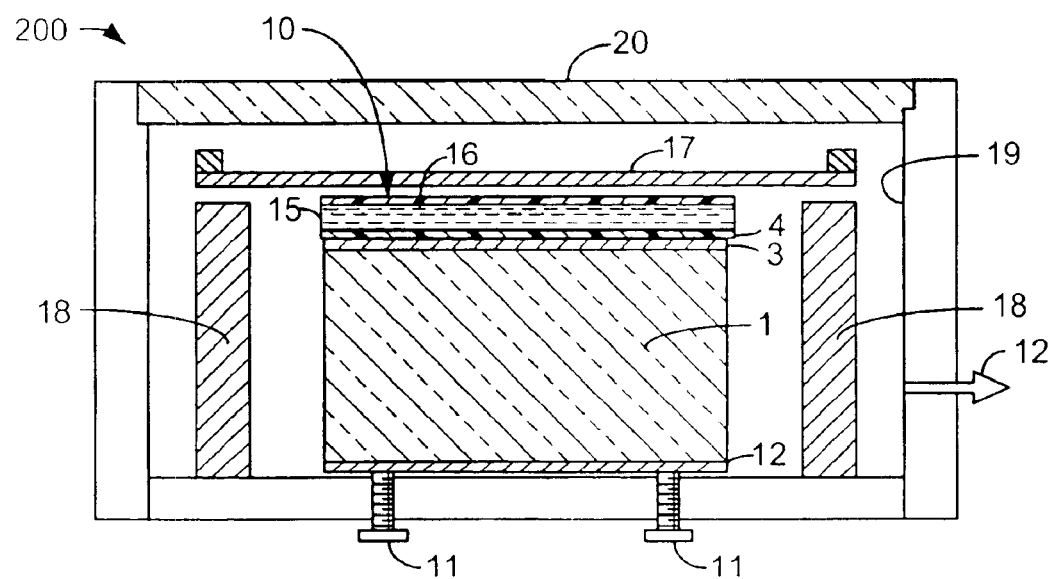
FIG. 4 is a side cross-sectional view of a lamination chamber used in accordance with the invention.

Referring to FIG. 4, a dielectric mirror on a flexible substrate (pellicle 17) is then vacuum laminated to the layer bearing the adhesive 16 (Step F). Dielectric stacking on thin polymer film (such as 7-micron thick Mylar®) may be used as a mirror that is laminated onto the top of the adhesive layer 16 by using a vacuum-assisted lamination system. FIG. 4 illustrates a suitable fixture 200. After placing an O-ring supported pellicle 17 on top of a positioning fixture 18, the pellicle 17 is slightly spaced from the adhesive coating 16 surface. A top cover window 10 sealed to the enclosure walls 19 provides a complete enclosure and a visual of the interior. A vacuum, such as about ¾ atmosphere is drawn at an outlet port 12. Vacuum adjust worm screws 11 are used to raise the BK-7 substrate 1 at a slight angle until one edge is just touching the pellicle 17. Due to the strong adhesion, the pellicle 17 progressively attaches itself to the adhesive layer 16. The process continues until the entire surface adheres. The progressive off-angle approach minimizes the likelihood of air bubbles forming in the adhesive-pellicle interface. The sides of pellicle 7 may then be bent down and taped against the sides of the substrate 1.

The invention has been explained with reference to specific embodiments. Other embodiments will be evident to those of ordinary skill in the art. It is therefore not intended that this invention be limited, except as indicated by the appended claims.

What is claimed is:

1. A method for manufacturing an electro-optic modulator structure comprising:

providing a glass substrate;

spin coating a sensor material onto the surface of the glass substrate with controlled evaporation and absent an adhesive to obtain a coated substrate;

spin coating a water-based substance as an adhesive layer onto the sensor material of the coated substrate to obtain an adhesive coated substrate; and laminating a pellicle onto the adhesive coated substrate.

2. The method according to claim 1 wherein the sensor material is polymer dispersed liquid crystal ("PDLC").

3. The method according to claim 1 wherein the sensor material is a solvent-based PDLC.

4. The method according to claim 1 wherein the spinner bowl is at least partially sealed.

5. The method according to claim 1 wherein the evaporation is controlled by spin speed, ambient pressure and distance between substrate and flat spin coater cover.

6. The method according to claim 1 wherein accelerated evaporation time is between about 2 minutes and 8 minutes for a 5 ml deposition.

7. The method according to claim 1 wherein the providing step includes placing a collar fixture around the glass substrate to regularize its surface.

8. The method according to claim 1 further including the step of cleaning edges of the coated substrate of excess sensor material.

* * * * *